No. 80,066. PATENTED JULY 21, 1868.
J. B. GIBSON.
VALVE COCK.
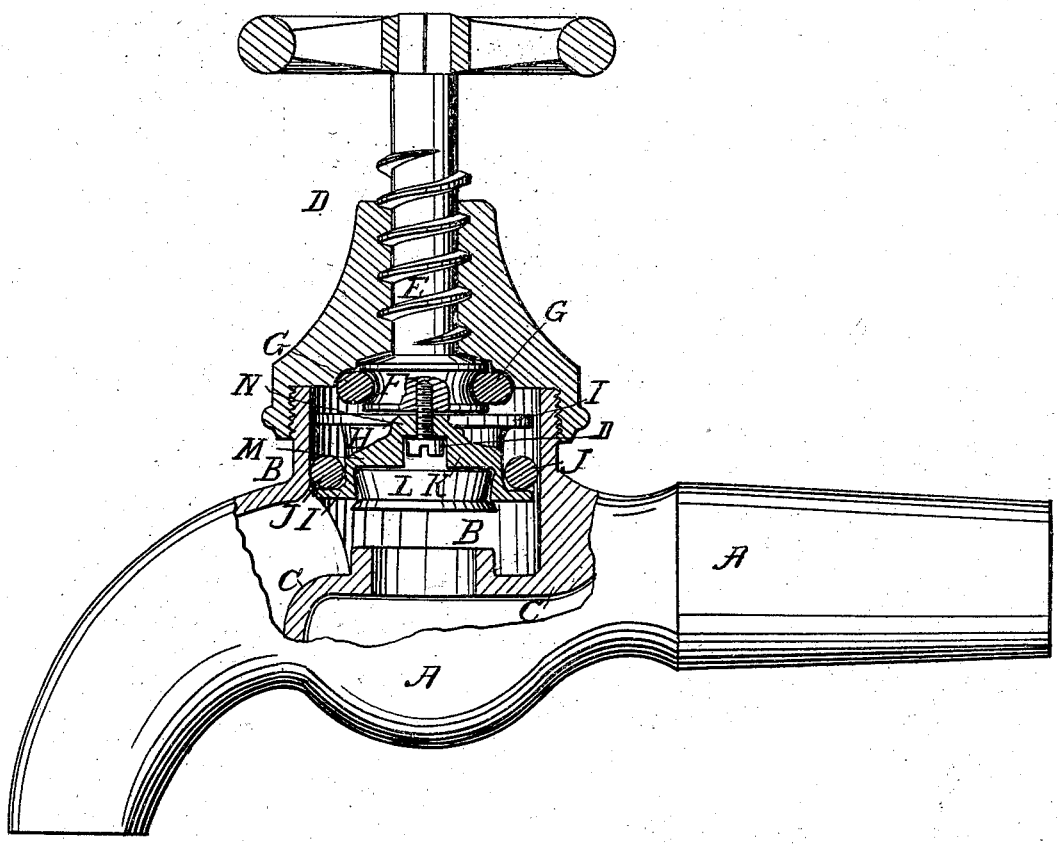
Witnesses:
Jas. H. Layman.
C. N. Puhlos
Inventor:
J. B. Gibson
By Knight Bros
Attys

United States Patent Office.

JOHN B. GIBSON, OF CINCINNATI, OHIO.

Letters Patent No. 80,066, dated July 21, 1868.

---

IMPROVEMENT IN VALVE-COCKS.

---

The Schedule referred to in these Letters Patent and making part of the same.

---

TO WHOM IT MAY CONCERN:

Be it known that I, JOHN B. GIBSON, of Cincinnati, Hamilton county, Ohio, have invented a new and useful Improvement in Valve-Cocks; and I hereby declare the following to be a full, clear, and exact description thereof, reference being had to the accompanying drawing, making part of this specification.

This invention is an improvement in the class of cocks which contain a disk or conical valve operated by a screw-stem; and the first part of my invention relates to an arrangement of roller-packing, whereby the valve-stem is effectually protected from leakage at its open position, without the necessity of a stuffing-box.

The second part of my invention relates to an improved mode of attaching the disk or valve to its stem.

In the accompanying drawing, the operative parts of a valve-cock, embodying my invention, are represented by axial section.

A represents the body or barrel, B the neck, and C the diaphragm of a customary valve-cock. The neck B is screw-threaded exteriorly, to receive an interiorly screw-threaded cap, D, which cap is tapped to receive the screw-threaded valve-stem E, which terminates below in a circumferentially-grooved collar, F, which collar is encircled by a band or ring, G, of vulcanized rubber, which, at the extreme point of retraction of the stem, is compressed against the under side of the cap, so as to effectually close the joint between the stem and cap in the manner represented.

The valve H is armed with an upper collar, I, and a lower collar, I'; and encircled by a rolling packing, formed by a ring of circular section, of India rubber, J, which, with every elevation and depression of the valve, rolls from one to the other collar, and operates to prevent leakage without perceptibly obstructing the operation of the valve. Nevertheless, should any water pass the packing J, its escape will be effectually prevented by the upper ring, G, The valve H has, at bottom, an undercut cavity, K, to receive a rubber disk, L, and at the centre of the cavity K is still another cavity, M, for the head, n, of a screw, N, by which the valve H is secured to the lower extremity of the stem.

The disk L being inserted, serves the twofold purpose of enabling the valve to be closed air-tight upon its seat, and of covering in the screw N, and protecting it from the action of the liquid.

The use of the upper or auxiliary elastic ring G effectually prevents the danger of stripping or bruising the stem-thread by a too violent opening of the valve, because the said ring operates as a cushion, which gradually eases the upward bearing of the stem.

I claim herein as new, and of my invention—

1. The rubber rings G and J, as arranged, in combination with the valve H, stem E, and cap D, as explained.
2. The arrangement of stem E, valve H, recessed screw N, and rubber disk L, as and for the purpose set forth.

In testimony of which invention, I hereunto set my hand.

JOHN B. GIBSON.

Witnesses:
GEO. H. KNIGHT,
JAMES H. LAYMAN.